United States Patent [19]
Oda

[11] Patent Number: 6,045,152
[45] Date of Patent: Apr. 4, 2000

[54] AUTOMOBILE SAFETY BAG ASSEMBLY INCORPORATING AIR BAG COVER OF IMPROVED THERMOPLASTIC ELASTOMER

[75] Inventor: Shigeru Oda, Itami, Japan

[73] Assignee: Sumitomo Bakelite Company Limited, Tokyo, Japan

[21] Appl. No.: 08/917,545

[22] Filed: Aug. 26, 1997

Related U.S. Application Data

[62] Division of application No. 08/614,480, Mar. 13, 1996, abandoned.

[30] Foreign Application Priority Data

Mar. 23, 1995 [JP] Japan ..................... 7-063645

[51] Int. Cl.$^7$ .......................... B60R 21/20; B60R 21/24; C08J 5/54; C08J 51/00
[52] U.S. Cl. ................. 280/728.3; 280/729; 280/731; 280/732; 428/43; 524/269; 524/505
[58] Field of Search .................. 280/729, 728.3, 280/731, 732; 428/43; 524/269, 505

[56] References Cited

U.S. PATENT DOCUMENTS

| | | | |
|---|---|---|---|
| 4,148,503 | 4/1979 | Shiratori et al. | 280/731 |
| 5,013,065 | 5/1991 | Kreuzer | 280/743 |
| 5,093,422 | 3/1992 | Himes | 525/98 |
| 5,358,986 | 10/1994 | Onofusa et al. | 524/284 |
| 5,502,095 | 3/1996 | Ueshima et al. | 524/269 |

FOREIGN PATENT DOCUMENTS 2 254 681   10/1992   United Kingdom .

*Primary Examiner*—Peter D. Mulcahy
*Attorney, Agent, or Firm*—Browdy and Neimark

[57] ABSTRACT

An air-bag cover is formed of a thermoplastic elastomer composition of (a) 5–50% by weight of a hydrogenated block copolymer having a number-average molecular weight of 50000 or more obtained by hydrogenating a block copolymer comprising at least two terminal polymer blocks A mainly of a vinyl aromatic compound and at least one intermediate polymer block B mainly of a conjugated diene compound, (b) 20–60% by weight of a copolymer of propylene and an α-olefin of 2–8 carbon atoms having a heat distortion temperature of 90° C. or higher, (c) 5–50% by weight of a paraffinic oil, 5–70% by weight of (d) an ethylene-α-olefin copolymer rubber and/or an ethylene-α-olefin-non-conjugated diene copolymer rubber having a glass transition temperature of −30° C. or lower and/or (e) a thermoplastic elastomer of a dynamically vulcanized blend of an ethylene-α-olefin copolymer rubber and a polyolefin resin or a dynamically vulcanized blend of an ethylene-α-olefin-non-conjugated diene copolymer rubber and a polyolefin resin and which has a brittle temperature of −50° C. or lower, and (f) 0.1–10% by weight of a silicone oil having a viscosity (JIS Z8803, 25° C.) of 50000 centistokes or higher.

21 Claims, No Drawings

AUTOMOBILE SAFETY BAG ASSEMBLY INCORPORATING AIR BAG COVER OF IMPROVED THERMOPLASTIC ELASTOMER

This application is a division of patent application Ser. No. 08/614,480, filed Mar. 13, 1996, now abandoned without prejudice in favor of the present application.

FIELD OF THE INVENTION

The present invention relates to a thermoplastic elastomer composition which is capable of providing a satisfactory expansibility for air bags and having excellent fragment scattering resistance at the expansion of the air bags and which necessitates no coating when used for air bag covers of air bag systems used as a safety device for automobiles, etc.

BACKGROUND OF THE INVENTION

Hitherto, a polyurethane in which a reinforcing nylon net is incorporated has been used as an air bag cover, and upon expansion of the air bag which is folded and stored in the air bag cover, the air bag cover bursts at the thin-wall part thereof where the reinforcing net is not present. However, such an air bag cover suffers from the problem that when the reinforcing nylon net is not used, cracks occur at the parts other than the thin-wall burst part or the cover is fragmented and scattered at the time of bursting. When the reinforcing nylon net is used, the problem in bursting at the time of expansion of the air bag is solved, but there are production problems in that the molding of the air bag cover takes time for setting the position of the reinforcing net, the rejection rate increases due to deviation of the position of the reinforcing nylon net, and productivity decreases because of the need for relatively slow polyurethane RIM molding.

Furthermore, various air bag covers formed of thermoplastic resins having no reinforcing nylon net have been studied. However, in the case of these air bag covers, it has been very difficult for them to have a softness of 60–99 in spring hardness (JIS K 6301) as that passengers do not feel uncomfortable when these resins used as interior trims for automobiles, to work properly for air bag expansion at a temperature of −40° C. to 90° C., and to prevent occurrence of cracks in the part other than the burst part and consequent scattering of fragments at the time of expansion of the air bag.

Among them, some of polyolefin thermoplastic resins can provide good expansibility at −40° C. to 90° C. just after molding, but cannot provide sufficient expansibility for the air bag and sufficient fragment scattering resistance of the cover at −40° C. to 90° C. after having been subjected to a high-temperature aging test or weathering test because of the change in properties caused by change in phase structure such as change in crystallinity of the polyolefin thermoplastic resins. That is, at present, no air bag covers have been developed which have a spring hardness of 60–99 and can provide excellent expansibility for the air bag not only just after molded, but also after having been subjected to high-temperature aging test or weathering test.

Furthermore, most of these air bag covers investigated at present are coated for prevention of scratches with nails or clothings, uncomfortable feeling such as tackiness, and discoloration caused by sunlight, and, therefore, air bag covers which need not to be coated have been desired from productivity and economical viewpoints. Hitherto, in order to improve scratch resistance or reduce the tackiness, it has been attempted to increase the surface slippage of the molded products by adding organic lubricants such as higher fatty acids, higher fatty acid esters and higher fatty acid amides or silicone oils of low viscosity. However, these additives migrate very much to the surface over time or because of heat, and damage the appearance of the molded products or deteriorate the scratch resistance.

SUMMARY OF THE INVENTION

The object of the present invention is to overcome the problems in the conventional techniques and provide a novel thermoplastic elastomer composition capable of forming satisfactory non-coated air bag covers for the air bag system used as a safety device for automobiles, etc., which covers do not need reinforcing nylon nets and which have a spring hardness (JIS K6301) of 60–99. Such air bag covers have never been attained by the conventional urethane coated products having reinforcing nylon nets therein.

As a result of intensive research, an air bag cover has been obtained which is excellent in expansion of an air bag and in fragment scattering resistance at the time of expansion of the air bag in a wide temperature range of −40° C. to 90° C., by employing the following composition: a styrene elastomer (component (a)) having particularly a number-average molecular weight of 50000 or more among styrene elastomers known as hydrogenated block copolymers is used as a main component; expansibility of the air bag at the lower temperature side is improved by adding and alloying a copolymer rubber (component (d)) or a thermoplastic elastomer (component (e)); expansibility at the higher temperature side is improved by adding and alloing a copolymer (component (b)) of propylene and an α-olefin of 2–8 carbon atoms; and scratch resistance and tackiness are improved by a silicone oil (component (f)) having a viscosity of 50000 centistokes or higher. It has further been found that an air bag cover which is excellent in expansibility of an air bag and in fragment scattering resistance at the time of expansion in a wide temperature range of −40° C. to 90° C. not only just after molding, but also after having been subjected to high-temperature aging test or weathering test and which does not need to be coated, can be obtained by optimum combination of the above components. Thus, the present invention has been accomplished.

That is, the present invention provides a thermoplastic elastomer composition suitable for air bag covers excellent in high-temperature and low-temperature expanding performances, which is obtained by melt-kneading the following components (a), (b), (c), (d) and (f); or (a), (b), (c), (e) and (f); or (a), (b), (c), (d)+(e) and (f) and pelletizing the kneaded product.

(a) 5–50% by weight of a hydrogenated block copolymer having a number-average molecular weight of 50000 or more which is obtained by hydrogenating a block copolymer comprising at least two terminal polymer blocks A mainly composed of a vinyl aromatic compound and at least one intermediate polymer block B mainly composed of a conjugated diene compound.

(b) 20–60% by weight of a copolymer of propylene and an α-olefin of 2–8 carbon atoms which has a heat distortion temperature of 90° C. or higher.

(c) 5–50% by weight of a paraffinic oil.

5–70% by weight of (d) an ethylene-α-olefin copolymer rubber and/or an ethylene-α-olefin-non-conjugated diene copolymer rubber which have a glass transition temperature of −30° C. or lower and/or (e) a thermoplastic elastomer which has a brittle temperature of −50° C. or lower and which comprises a dynamically vulcanized blend of an ethylene-α-olefin copolymer rubber and a polyolefin resin or a dynamically vulcanized blend of an ethylene-α-olefin-non-conjugated diene copolymer rubber and a polyolefin resin.

(f) 0.1–10% by weight of a silicone oil having a viscosity (JIS Z8803, 25° C.) of 50000 centistokes (hereinafter referred to as "cst") or higher.

The present invention will be explained in detail below.

The hydrogenated block copolymer used in the present invention is obtained by hydrogenating a block copolymer comprising at least two terminal polymer blocks A mainly composed of a vinyl aromatic compound and at least one intermediate polymer block B mainly composed of a conjugated diene compound, and is a hydrogenated product of a vinyl aromatic compound-conjugated diene compound block copolymer having the structure represented by the following formula.

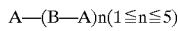

A—(B—A)n(1≦n≦5)

The hydrogenated block copolymer has a spring hardness of 99 or less, preferably 90 or less and contains 5–50% by weight, preferably 10–40% by weight of the vinyl aromatic compound. Referring to the block structure, the terminal polymer block A mainly composed of the vinyl aromatic compound has the structure of a vinyl aromatic compound polymer block or a copolymer block comprising a vinyl aromatic compound and a hydrogenated conjugated diene compound, which contains more than 50% by weight, preferably 70% by weight or more of a vinyl aromatic compound. Furthermore, the intermediate polymer block B mainly composed of a hydrogenated conjugated diene compound has the structure of a hydrogenated conjugated diene polymer block or a copolymer block comprising a hydrogenated conjugated diene compound and a vinyl aromatic compound, which contains more than 50% by weight, preferably 70% by weight or more of a hydrogenated conjugated diene compound. When there are two or more polymer blocks mainly composed of a vinyl aromatic compound and two or more polymer blocks mainly composed of a hydrogenated conjugated diene compound, the polymer blocks may have the same or different structure, respectively.

As the vinyl aromatic compound which constitutes the hydrogenated block copolymer, there may be used, for example, one or two or more of styrene, α-methylstyrene, vinyltoluene, p-tert-butylstyrene, etc. and styrene is preferred. As the conjugated diene compound before hydrogenated which constitutes the hydrogenated conjugated diene compound, there may be used, for example, one or two or more of butadiene, isoprene, 2,3-dimethyl-1,3-butadiene, etc., and preferred are butadiene, isoprene and a combination of them. The molecular structure of the hydrogenated block copolymer may be any of straight chain, branched chain, radiate chain or any combination thereof.

The number-average molecular weight (Mn) of the hydrogenated block copolymer as the component (a) used in the present invention is 50000 or more, preferably 90000–200000, and the molecular weight distribution Mw/Mn (Mw: weight-average molecular weight) is 10 or less, preferably 5 or less, more preferably 2 or less. When the number-average molecular weight is less than 50000, sufficient heat resistance cannot be imparted. When the molecular weight distribution exceeds 10, strength and heat resistance decrease. The amount of the component (a) is 5–50% by weight, preferably 10–45% by weight. When the amount is less than 5% by weight, sufficient strength or impact resistance cannot be imparted at both high temperatures and low temperatures, and when it exceeds 50% by weight, the fluidity considerably deteriorates and molded products of good appearance cannot be obtained.

Moreover, since the hydrogenated block copolymer as the component (a) has a large number-average molecular weight, a paraffinic oil as the component (c) referred to hereinafter can optionally be used in an oil-extended product to improve workability.

The copolymer of propylene and an α-olefin of 2–8 carbon atoms used as the component (b) in the present invention is effective to improve processability and heat resistance of the resulting composition. Examples of the copolymer are random or/and block copolymers of propylene and a small amount of another α-olefin, such as propylene-ethylene copolymer, propylene-1-hexene copolymer, propylene-4-methyl-1-pentene copolymer, propylene-butene-1 copolymer, etc. Among them, propylene-ethylene block copolymer is preferred and that of 2–30% by weight in ethylene content is especially preferred. Furthermore, a nucleating agent is preferably added in order to inhibit change of properties in high-temperature aging test and weathering test. This copolymer of propylene and an α-olefin of 2–8 carbon atoms preferably has a melt flow rate (ASTM-D-1238L, 230° C.) of 0.1–60 g/10 min, especially 0.5–50 g/10 min. When the melt flow rate is less than 0.1 g/10 min, fluidity at molding is deteriorated and when it is more than 60 g/10 min, heat resistance decreases. The heat distortion temperature (JIS K7207 4.6 kgf/cm$^2$) is limited to 90° C. or higher, because if it is lower than 90° C., there is given no effect to improve the heat resistance. The amount of the component (b) is 20–60% by weight, preferably 30–50% by weight. When the amount is less than 20% by weight, a sufficient heat resistance cannot be imparted, and when it exceeds 60% by weight, impact resistance at low temperatures remarkably decreases and satisfactory expanding performance cannot be exhibited at the time of expansion of the air bag cover at −40° C.

The paraffinic oil as the component (c) used in the present invention is an essential component having action to adjust the hardness of the resulting composition and give flexibility to the composition. In general, mineral oil softening agents for rubbers called as process oils or extender oils used for softening, volume increasing and improving the processability of rubbers are mixtures of an aromatic ring, a naphthene ring and a paraffin chain, and the mixtures in which the carbon number of the paraffin chain is at least 50% of the total carbon number are called paraffinic oils, the mixtures in which the carbon number of the naphthene ring is 30–45% of the total carbon number are called naphthenic oils and the mixtures in which the carbon number of the aromatic ring is more than 30% of the total carbon number are called aromatic oils. The oil used as the component (c) in the present invention is the paraffinic one among the above oils, and the naphthenic and aromatic oils are not preferred in dispersibility and dissolvability. The paraffinic softening agents for rubbers have the properties of a dynamic viscosity of 20–500 cst at 37.8° C., a pour point of −10 to −15° C. and a flash point of 170–300° C. The amount of the paraffinic oil as the component (c) is 5–50% by weight, preferably 10–30% by weight. When the amount is less than 5% by weight the resulting composition is close to a resin composition and increases in hardness and loses flexibility and, besides, is not preferred from the economical viewpoint.

When it exceeds 50% by weight, the softening agent is apt to bleed out and there are the possibilities of giving tackiness to the final product and of deteriorating mechanical properties.

The copolymer rubber used as the component (d) of the present invention is an essential component for improving the expansibility of the air bag at −40° C. The α-olefins in the ethylene-α-olefin copolymer rubbers and/or the ethylene-α-olefin-nonconjugated diene copolymer rubbers are suitably those of 3–15 carbon atoms. The non-conjugated dienes include, for example, dicyclopentadiene, 1,4-hexadiene, ethylidenenorbornene and methylenenorbornene. In the present invention, propylene is suitable as the α-olefins from the points of easy availability and improvement of impact resistance. Thus, the so-called EPR and EPDM are suitable as the component (d). The ethylene/α-olefin ratio in the copolymer rubber is preferably 50/50–90/10, more preferably 60/40–80/20 in weight ratio. The glass transition temperature is specified to be −30° C. or lower in the present invention, because the copolymer rubber having a glass transition temperature of higher than −30° C. cannot improve the expansibility of the air bag at −40° C. The amount of the component (d) can be selected from the range of 5–70% by weight, preferably 10–65% by weight. When the amount of the component (d) is less than 5% by weight, the improvement of expansibility of the air bag at −40° C. which is an effect by adding the copolymer rubber, cannot be recognized. When it exceeds 70% by weight, the strength of the resulting elastomer composition at high temperatures cannot be held, and not only the air bag expansibility at 90° C. is insufficient, but also the shape retention at high temperatures is remarkably deteriorated, and thus, the molded product cannot be used.

The thermoplastic elastomer used as the component (e) in the present invention is a component for improving the air bag expansibility at −40° C., and the α-olefin in the copolymer rubber is suitably that of 3–15 carbon atoms. The non-conjugated dienes include, for example, dicyclopentadiene, 1,4-hexadiene, ethylidenenorbornene and methylenenorbornene. In the present invention, propylene is suitable as the α-olefin from the points of easiness in availability and improvement of impact resistance. Therefore, the so-called EPDM is suitable as the ethylene-α-olefin-non-conjugated diene copolymer rubber in the component (e). The ethylene/α-olefin ratio in the copolymer rubber is preferably 50/50–90/10, more preferably 60/40–80/20 in weight ratio.

As the vulcanizing agent, there may be used ordinary vulcanizing agents for rubbers, and especially preferred are alkylphenol-formaldehyde resins and organic peroxides such as dicumyl peroxide in addition to sulfur. A vulcanizing aid and an antioxidant may also be used in combination with the vulcanizing agent. The amount of the alkylphenol-formaldehyde resin is preferably 0.5–15 parts by weight for 100 parts by weight of the copolymer rubber from the point of balancing of the strength and the processability. In the case of the organic peroxides, the range of 0.05–1 part by weight for 100 parts by weight of the copolymer rubber is preferred from the point of balancing of the strength and the processability. It is indispensable for maintaining the processability that at least 5% by weight of the polyolefin resin is contained for 100 parts by weight of the copolymer rubber. The component (e) can be obtained by vulcanizing a blend of the copolymer rubber and the polyolefin resin with a vulcanizing agent added while the blend is dynamically melt-kneaded. The brittle temperature of the thermoplastic elastomer is specified to be −50° C. or lower, because thermoplastic elastomers having a brittle temperature of higher than −50° C. cannot improve the air bag expansibility at −40 C.

The amount of the component (e) can be selected from the range of 5–70% by weight, preferably 10–65% by weight. When the amount of the component (e) is less than 5% by weight, the improvement of the air bag expansibility at −40° C. which is an effect by adding the thermoplastic elastomer, cannot be obtained. When it exceeds 70% by weight, the strength of the resulting elastomer composition at high temperatures cannot be held, and not only the air bag expansibility at 90° C. is insufficient, but also the shape retention at high temperatures is considerably deteriorated, and hence the molded product cannot be used.

Furthermore, the component (d) and the component (e) may be used in admixture. In this case, the total amount is 5–70% by weight.

The silicone oil which is the component (f) used in the present invention is a component which imparts scratch resistance and prevents tackiness inherent to elastomers. The substituents bonded to the siloxane main chain in the molecular structure of the silicone oil are unlimited, but dimethyl silicone oil, methylphenyl silicone oil and alkyl-modified silicone oils can be suitably used. The viscosity of the silicone oil as the component (f) is 50000 cst or higher, preferably 100000 cst or higher. When the viscosity is lower than 50000 cst, the initial scratch resistance and tackiness can be improved, but bleeding to the surface of molded products becomes conspicuous with lapse of time or with heat. The amount of the component (f) is 0.1–10% by weight, preferably 0.5–5% by weight. When the amount of the component (f) is less than 0.1% by weight, the scratch resistance and tackiness cannot be sufficiently improved, and when it is more than 10% by weight, the mechanical strength of the resulting composition is deteriorated and, furthermore, it is economically not preferred. In the use of this silicone oil, the silicone oil may be previously incorporated into the thermoplastic resin for the improvement of the dispersibility of the silicone oil and the improvement of workability.

In addition to the above components (a)–(f), if necessary, the composition of the present invention may further contain inorganic fillers and inexpensive resins such as polystyrene resins. These have the advantage of reducing the production cost as bulk fillers and, besides, the advantage of giving a positives effect to improve the qualities (inorganic filler: thermal shape retention and impartation of flame retardance; polystyrene resin: improvement of processability). The inorganic fillers include, for example, calcium carbonate carbon black, talc, magnesium hydroxide, mica, barium sulfate, natural silicic acid, synthetic silicic acid (white carbon) and titanium oxide, and channel black, furnace black, etc. can be used as the carbon black. Among these inorganic fillers, talc and calcium carbonate are economically useful and preferred. As the polystyrene resins used for this purpose, those which are obtained by radical polymerization process and ionic polymerization process can be suitably used, and the number-average molecular weight of the polystyrene resins can be selected from the range of 5000–500000, preferably 10000–200000. The molecular weight distribution Mw/Mn is preferably 5 or less. Furthermore, if necessary, there may be added nucleating agent, outer lubricant, inner lubricant, ultraviolet absorber, hindered amine light stabilizer, hindered phenol antioxidant, colorant, etc.

The composition of the present invention can be produced by general processes employed for production of usual resin compositions and rubber compositions. They are basically mechanical melt kneading processes, and actually single-screw extruder, twin-screw extruder, Banbury mixer, various kneaders, Brabender, roll, etc. can be used. In this case, the order of addition of the components is not limited, and, for example, all the components are preliminarily mixed by a mixer such as Henschel mixer, blender or the like and melt kneaded by the above kneading machine, or some components are preliminarily mixed and melt kneaded to prepare a master batch and the other components are added thereto, followed by melt-kneading. In these cases, the melt-kneading temperature is suitably 150–300° C.

The resulting hydrogenated block copolymer composition is fed to an injection molding machine provided with a mold for air bag cover and injection molded in a short time to obtain an air bag cover. There is the merit that since the composition of the present invention is thermoplastic and recycle molding can be carried out, the unnecessary flash, runner part and sprue part of the injection molded product can be utilized again as materials for air bag covers.

In the case of using the air bag cover molded from the composition of the present invention, satisfactory expansion of the air bag can be attained without causing occurrence of cracks in the part other than the burst part of the cover or without scattering of fragments of the cover at the time of expansion of the air bag at −40° C. to 90° C. Moreover, the air bag cover is also excellent in long-term reliability in high-temperature aging resistance, weathering test, etc. Furthermore, there are great values of utilization that the composition has superior processability, the productivity is satisfactory, the color matching is simple and the production cost is low as compared with the conventional polyurethane reinforced with a nylon net.

The following examples will explain the present invention in more detail. They should not be construed as limiting the invention in any manner.

The components used in the following examples and comparative examples are as follows.

<Component (a)-1>
Septon 4055 manufactured by Kuraray Co., Ltd.: This has the structure of polystyrene-hydrogenated polyisoprene-polystyrene, contains 30% by weight of bonded styrene and has a number-average molecular weight of about 170000.

<Component (a)-2>
Tafteck H1272 manufactured by Asahi Kasei Kogyo K.K.: This has the structure of polystyrene-hydrogenated polybutadiene-polystyrene, contains 35% by weight of bonded styrene and has a number-average molecular weight of about 120000 [product extended with 35 wt % paraffinic oil (Diana Process Oil PW-380 manufactured by Idemitsu Kosan Co., Ltd. having a dynamic viscosity: 381.6 cst (40° C.), 30.1 cst (100° C.), an average molecular weight of 746, and a ring analysis value: CA=0%, CN=27%, CP=73%)].

<Component (a)-3>
Tafteck H1071 manufactured by Asahi Kasei Kogyo K.K.: This has the structure of polystyrene-hydrogenated polybutadiene-polystyrene, contains 20% by weight of bonded styrene and has a number-average molecular weight of about 70000.

<Component (a)-4>(comparative)
Septon 2007 manufactured by Kuraray Co., Ltd.: This has the structure of polystyrene-hydrogenated polyisoprene-polystyrene, contains 30% by weight of bonded styrene and has a number-average molecular weight of about 40000.

<Component (b)-1>
Asahi Polypro M7646 manufactured by Asahi Kasei Kogyo K.K.: An ethylene-propylene block copolymer having a melt flow rate of 15 dg/min (ASTM D1238) and a heat distortion temperature of 120° C. (ASTM D648 (4.6 kgf/cm$^2$)).

<Component (b)-2>(comparative)
Asahi Polypro M1700 manufactured by Asahi Kasei Kogyo K.K.: A polypropylene having a melt flow rate of 31 dg/min (ASTM D1238) and a heat distortion temperature of 119° C. (ASTM D648 (4.6 kgf/cm$^2$)).

<Component (c)>
Diana Process Oil PW-380 manufactured by Idemitsu Kosan Co., Ltd. [A paraffinic process oil having a dynamic viscosity: 381.6 cst (40° C.), 30.1 cst (100° C.), an average molecular weight of 746, and ring analysis values: CA=0%, CN=27%, CP=73%].

<Component (d)>
An ethylene-propylene copolymer rubber EP07P manufactured by Japan Synthetic Rubber Co., Ltd. [propylene content; 25% by weight, MFR (230° C.): 0.7 g/10 min, Tg: −38° C.]

<Component (e)>
Sumitomo TPE3570 manufactured by Sumitomo Chemical Co., Ltd. [A thermoplastic elastomer obtained by dynamically vulcanizing 100 parts by weight of an ethylene-propylene-ethylidenenorbornene copolymer (propylene content: 28% by weight, and iodine value: 15), 40 parts by weight of a polypropylene (melt flow rate: 8 g/10 min, and heat distortion temperature: 115° C.) and 0.5 part by weight of dicumyl peroxide as a vulcanizing agent by a twin-screw kneading machine: a brittle temperature of −60° C. or lower]

<Component (f)-1>
KF96H-100000 [A silicone oil manufactured by Shinetsu Chemical Co., Ltd. having a viscosity of 100000) cst (25° C.), a specific gravity of 0.977 (25° C.), a refractive index of 1.403 (25° C.) and a pour point of lower than −50° C.]

<Component (f)-2>(comparative)
KF96H-10000 [A straight silicone oil manufactured by Shinetsu Chemical Co., Ltd. having a viscosity of 10000 cst (25° C.), a specific gravity of 0.975 (25° C.), a refractive index of 1.403 (25° C.) and a pour point of lower than −50° C.]

In each of Examples 1–12 and Comparative Examples 1–12, the components were sufficiently blended under dry condition at the ratio as shown in Tables 1–4 and the blend was melt kneaded and extruded by a twin-screw kneading machine at a resin temperature of 180–270° C. to pelletize the blend. The following evaluations were conducted using the pellets.

(1) Spring hardness (JIS K6301):
A pressed sheet was prepared from the pellets and subjected to the measurement.

(2) Appearance:
An air bag cover having a thickness of 0.5 mm in the burst part and a thickness of 2–5 mm in the part other than the burst part was prepared by molding the pellets by an injection molding machine, and was visually evaluated on the appearance such as flow mark, gloss or the like just after molding and after subjected to high-temperature aging test at 110° C. for 400 hours. The results are shown by the following criteria.

"○": Good
"Δ": Somewhat bad
"x": Bad (3) Shape retention under heat:
The above molded air bag cover was subjected to shape retention test under an environment of 110° C. The sample which was good in shape retention after lapse of 24 hours is shown by "○" and the sample which underwent distortion, etc. is shown by "x".

(4) Expansion test:
(4)-1: At ordinary state:

The above molded air bag cover was subjected to air bag expansion test at environmental temperatures of 90° C., 23° C. and −40° C. The results are shown by the following criteria.

"○": The air bag was satisfactorily expanded from the burst part of the air bag cover.

"x": Cracks occurred in the part other than the burst part of the air bag cover, or the cover was fragmented and the fragments were scattered, or the air bag was not satisfactorily expanded.

(4)-2: After high-temperature aging test:

The above molded air bag cover was subjected to high-temperature aging test under an environment of 110° C. After subjected to the high-temperature aging test for 400 hours, the air bag cover was subjected to air bag expansion test at environmental temperatures of 90° C., 23° C. and −40° C. The results are shown by the following criteria.

"○": The air bag was satisfactorily expanded from the burst part of the air bag cover.

"x": Cracks occurred in the part other than the burst part of the air bag cover, or the cover was fragmented and the fragments were scattered, or the air bag was not satisfactorily expanded.

(5) Scratch resistance test:

The upper surface of the molded air bag cover was rubbed with Shirting #3 fabric (JIS L-0803) under a normal load of 100 gf and with a contact area of about 1 cm² with the surface of the cover by reciprocating ten times the fabric on the upper surface of the cover at 100 mm/sec and at a reciprocating distance of 100 mm. The surface of the molded cover after subjected to the test was visually evaluated and the results are shown by the following criteria.

"○": Substantially no scratches were seen.

"Δ": Some scratches were seen.

"x": Bad.

The results of Examples 1–12 are shown in Tables 1 and 2 and the results of Comparative Examples 1–12 are shown in Tables 3 and 4. The amount of the component (a)-2 is shown in % by weight excluding the extending oil component. When the component (a)-2 was used, the numerical value of the component (c) in the Table shows the total amount of the amount of the component (c) and the amount of the extending oil component in the component (a)-2.

It can be seen from the results that the air bag covers molded from the compositions of the present invention have a spring hardness of 60–99 and are excellent in the air bag expansibility at −40° C. to 90° C.

TABLE 1

|  | Examples | | | | | |
|---|---|---|---|---|---|---|
|  | 1 | 2 | 3 | 4 | 5 | 6 |
| Composition (% by weight) | | | | | | |
| Component (a)-1 | 5 | 5 | 25 | 30 | 50 | 15 |
| Component (b)-1 | 20 | 59 | 20 | 55 | 20 | 35 |
| Component (c) | 10 | 5 | 5 | 5 | 5 | 15 |
| Component (d) | 64 | 30 | 49.8 | 5 | 24 | 34 |
| Component (f)-1 | 1 | 1 | 0.2 | 5 | 1 | 1 |
| Evaluation | | | | | | |
| Hardness | 75 | 95 | 70 | 65 | 60 | 80 |
| Appearance | | | | | | |
| Just after molded | ○ | Δ | ○ | Δ | Δ | ○ |
| After high-temperature aging test | ○ | Δ | ○ | Δ | Δ | ○ |

TABLE 1-continued

|  | Examples | | | | | |
|---|---|---|---|---|---|---|
|  | 1 | 2 | 3 | 4 | 5 | 6 |
| Shape retention under heat | Δ | ○ | Δ | ○ | Δ | ○ |
| Expansion test | | | | | | |
| At ordinary state | | | | | | |
| 90° C. | ○ | ○ | ○ | ○ | ○ | ○ |
| 23° C. | ○ | ○ | ○ | ○ | ○ | ○ |
| −40° C. | ○ | ○ | ○ | ○ | ○ | ○ |
| After high-temperature aging test | | | | | | |
| 90° C. | ○ | ○ | ○ | ○ | ○ | ○ |
| 23° C. | ○ | ○ | ○ | ○ | ○ | ○ |
| −40° C. | ○ | ○ | ○ | ○ | ○ | ○ |
| Scratch resistance test | ○ | ○ | Δ | ○ | ○ | ○ |

TABLE 2

|  | Examples | | | | | |
|---|---|---|---|---|---|---|
|  | 7 | 8 | 9 | 10 | 11 | 12 |
| Composition (% by weight) | | | | | | |
| Component (a)-1 | 20 |  |  |  | 20 | 35 |
| Component (a)-2 |  |  |  | 35 | 15 |  |
| Component (a)-3 |  | 25 |  |  |  |  |
| Component (b)-1 | 39 | 40 | 29 | 35 | 40 | 30 |
| Component (c) | 10 | 15 | 20 | 15 | 10 | 15 |
| Component (d) | 30 | 19 | 15 |  |  | 10 |
| Component (e) |  |  |  | 34 | 29 | 9 |
| Component (f)-1 | 1 | 1 | 1 | 1 | 1 | 1 |
| Evaluation | | | | | | |
| Hardness | 90 | 80 | 75 | 80 | 90 | 75 |
| Appearance | | | | | | |
| Just after molded | ○ | ○ | ○ | ○ | ○ | ○ |
| After high-temperature aging test | ○ | ○ | ○ | ○ | ○ | ○ |
| Shape retention under heat | ○ | ○ | ○ | ○ | ○ | ○ |
| Expansion test | | | | | | |
| At ordinary state | | | | | | |
| 90° C. | ○ | ○ | ○ | ○ | ○ | ○ |
| 23° C. | ○ | ○ | ○ | ○ | ○ | ○ |
| −40° C. | ○ | ○ | ○ | ○ | ○ | ○ |
| After high-temperature aging test | | | | | | |
| 90° C. | ○ | ○ | ○ | ○ | ○ | ○ |
| 23° C. | ○ | ○ | ○ | ○ | ○ | ○ |
| −40° C. | ○ | ○ | ○ | ○ | ○ | ○ |
| Scratch resistance test | ○ | ○ | ○ | ○ | ○ | ○ |

TABLE 3

|  | Comparative Examples | | | | | |
|---|---|---|---|---|---|---|
|  | 1 | 2 | 3 | 4 | 5 | 6 |
| Composition (% by weight) | | | | | | |
| Component (a)-1 |  | 5 | 20 | 55 |  |  |
| Component (a)-4 |  |  |  |  | 20 | 35 |
| Component (b)-1 | 59 | 19 | 20 | 30 | 40 | 30 |
| Component (c) | 5 |  | 54 | 5 | 10 | 20 |
| Component (d) | 35 | 75 | 5 | 9 | 29 |  |
| Component (e) |  |  |  |  |  | 14 |
| Component (f)-1 | 1 | 1 | 1 | 1 | 1 | 1 |

TABLE 3-continued

|  | Comparative Examples | | | | | |
| --- | --- | --- | --- | --- | --- | --- |
|  | 1 | 2 | 3 | 4 | 5 | 6 |
| Evaluation | | | | | | |
| Hardness | 99 | 70 | 60 | 50 | 90 | 75 |
| Appearance | | | | | | |
| Just after molded | o | x | x | x | o | o |
| After high-temperature aging test | o | x | x | x | o | o |
| Shape retention under heat | o | o | x | o | o | o |
| Expansion test | | | | | | |
| At ordinary state | | | | | | |
| 90° C. | o | x | x | x | o | x |
| 23° C. | o | o | o | o | o | o |
| –40° C. | x | x | o | o | x | o |
| After high-temperature aging test | | | | | | |
| 90° C. | o | x | x | x | o | x |
| 23° C. | o | o | o | o | o | o |
| –40° C. | x | x | o | o | x | o |
| Scratch resistance test | o | o | o | o | o | o |

TABLE 4

|  | Comparative Examples | | | | | |
| --- | --- | --- | --- | --- | --- | --- |
|  | 7 | 8 | 9 | 10 | 11 | 12 |
| Composition (% by weight) | | | | | | |
| Component (a)-1 | 20 | 35 |  | 20 |  | 35 |
| Component (a)-4 |  |  | 15 |  | 15 |  |
| Component (b)-1 |  |  | 35 | 30 | 35 | 30 |
| Component (b)-2 | 39 | 30 |  |  |  |  |
| Component (c) | 10 | 19 | 15 | 11 | 15 | 15 |
| Component (d) |  | 15 |  |  |  |  |
| Component (e) | 30 |  | 35 | 19 | 34 | 19 |
| Component (f)-1 | 1 | 1 |  | 20 |  |  |
| Component (f)-2 |  |  |  |  | 1 | 1 |
| Evaluation | | | | | | |
| Hardness | 90 | 75 | 80 | 75 | 80 | 75 |
| Appearance | | | | | | |
| Just after molded | o | o | o | o | o | o |
| After high-temperature aging test | o | o | o | Δ | x | x |
| Shape retention under heat | o | o | o | x | o | o |
| Expansion test | | | | | | |
| At ordinary state | | | | | | |
| 90° C. | o | o | o | o | o | o |
| 23° C. | o | o | o | o | o | o |
| –40° C. | o | o | o | o | o | o |
| After high-temperature aging test | | | | | | |
| 90° C. | o | o | o | x | o | o |
| 23° C. | o | o | o | o | o | o |
| –40° C. | x | x | o | o | o | o |
| Scratch resistance test | o | o | x | o | o | o |

What is claimed is:

1. In an automobile safety bag assembly comprising an inflatable safety air bag and a cover for said air bag, the improvement wherein said cover is formed of a thermoplastic elastomer composition which comprises the following components:
(a) 5–50% by weight of a hydrogenated block copolymer having a number-average molecular weight of 50000 or more which is obtained by hydrogenating a block copolymer comprising at least two terminal polymer blocks A mainly composed of a vinyl aromatic compound and at least one intermediate polymer block B mainly composed of a conjugated diene compound,
(b) 20–60% by weight of a copolymer of propylene and an α-olefin of 2–8 carbon atoms which has a heat distortion temperature of 90° C. or higher,
(c) 5–50% by weight of a paraffinic oil,
(d) 5–70% by weight of an ethylene-α-olefin copolymer rubber and/or an ethylene-α-olefin-nonconjugated diene copolymer rubber which have a glass transition temperature of –30° C. or lower, and
(f) 0.1–10% by weight of a silicone oil having a viscosity (JIS Z8803, 25° C.) of 50000 centistokes or higher.

2. In an automobile safety bag assembly comprising an inflatable safety air bag and a cover for said air bag, the improvement wherein said cover is formed of a thermoplastic elastomer composition which comprises the following components:
(a) 5–50% by weight of a hydrogenated block copolymer having a number-average molecular weight of 50000 or more which is obtained by hydrogenating a block copolymer comprising at least two terminal polymer blocks A mainly composed of a vinyl aromatic compound and at least one intermediate polymer block B mainly composed of a conjugated diene compound,
(b) 20–60% by weight of a copolymer of propylene and an α-olefin of 2–8 carbon atoms which has a heat distortion temperature of 90° C. or higher,
(c) 5–50% by weight of a paraffinic oil,
(e) 5–70% by weight of a thermoplastic elastomer which comprises a dynamically vulcanized blend of an ethylene-α-olefin copolymer rubber and a polyolefin resin or a dynamically vulcanized blend of an ethylene-α-olefin-non-conjugated diene copolymer rubber and a polyolefin resin and which has a brittle temperature of –50° C. or lower, and
(f) 0.1–10% by weight of a silicone oil having a viscosity (JIS Z8803, 25° C.) of 50000 centistokes or higher.

3. In an automobile safety bag assembly comprising an inflatable safety air bag and a cover for said air bag, the improvement wherein said cover is formed of a thermoplastic elastomer composition which comprises the following components:
(a) 5–50% by weight of a hydrogenated block copolymer having a number-average molecular weight of 50000 or more which is obtained by hydrogenating a block copolymer comprising at least two terminal polymer blocks A mainly composed of a vinyl aromatic compound and at least one intermediate polymer block B mainly composed of a conjugated diene compound,
(b) 20–60% by weight of a copolymer of propylene and an α-olefin of 2–8 carbon atoms which has a heat distortion temperature of 90° C. or higher,
(c) 5–50% by weight of a paraffinic oil,
(d) an ethylene-α-olefin copolymer rubber and/or an ethylene-α-olefin-non-conjugated diene copolymer rubber which have a glass transition temperature of –30° C. or lower,
(e) a thermoplastic elastomer which comprises a dynamically vulcanized blend of an ethylene-α-olefin copolymer rubber and a polyolefin resin or a dynamically vulcanized blend of an ethylene-α-olefin-non-conjugated diene copolymer rubber and a polyolefin resin and which has a brittle temperature of –50° C. or lower, (d)+(e) being 5–70% by weight, and (f) 0.1–10% by weight of a silicone oil having a viscosity (JIS Z8803, 25° C.) of 50000 centistokes or higher.

4. A safety bag assembly according to claim 1, wherein the vinyl aromatic compound is selected from the group consisting of styrene, α-methylstyrene, vinyltoluene and p-tert-butylstyrene.

5. A safety bag assembly according to claim 1, wherein the conjugated diene compound is selected from the group consisting of butadiene, isoprene and 2,3-dimethyl-1,3 butadiene.

6. A safety bag assembly according to claim 1, wherein the α-olefin of 2–8 carbon atoms is selected from the group consisting of ethylene, butene-1, 1-hexene and 4-methyl-1-pentene.

7. A safety bag assembly according to claim 1, wherein the α-olefin in the ethylene-α-olefin copolymer rubber and the ethylene-α-olefin-non-conjugated diene copolymer rubber has 3–15 carbon atoms.

8. A safety bag assembly according to claim 1, wherein the non-conjugated diene in the ethylene-α-olefin-non-conjugated diene copolymer rubber is selected from the group consisting of dicyclopentadiene, 1,4-hexadiene, ethylidenenorbornene and methylenenorbornene.

9. A safety bag assembly according to claim 1, wherein the silicone oil is selected from the group consisting of dimethyl silicone oil, methylphenyl silicone oil and alkyl-modified silicone oil.

10. A safety bag assembly according to claim 2, wherein the vinyl aromatic compound is selected from the group consisting of styrene, α-methylstyrene, vinyltoluene and p-tert-butylstyrene.

11. A safety bag assembly according to claim 2, wherein the conjugated diene compound is selected from the group consisting of butadiene, isoprene and 2,3-dimethyl-1,3 butadiene.

12. A safety bag assembly according to claim 2, wherein the α-olefin of 2–8 carbon atoms is selected from the group consisting of ethylene, butene-1, 1-hexene and 4-methyl-1-pentene.

13. A safety bag assembly according to claim 2, wherein the α-olefin in the ethylene-α-olefin copolymer rubber and the ethylene-α-olefin-non-conjugated diene copolymer rubber has 3–15 carbon atoms.

14. A safety bag assembly according to claim 2, wherein the non-conjugated diene in the ethylene-α-olefin-non-conjugated diene copolymer rubber is selected from the group consisting of dicyclopentadiene, 1,4-hexadiene, ethylidenenorbornene and methylenenorbornene.

15. A safety bag assembly according to claim 2, wherein the silicone oil is selected from the group consisting of dimethyl silicone oil, methylphenyl silicone oil and alkyl-modified silicone oil.

16. A safety bag assembly according to claim 3, wherein the vinyl aromatic compound is selected from the group consisting of styrene, α-methylstyrene, vinyltoluene and p-tert-butylstyrene.

17. A safety bag assembly according to claim 3, wherein the conjugated diene compound is selected from the group consisting of butadiene, isoprene and 2,3-dimethyl-1,3 butadiene.

18. A safety bag assembly according to claim 3, wherein the α-olefin of 2–8 carbon atoms is selected from the group consisting of ethylene, butene-1, 1-hexene and 4-methyl-1-pentene.

19. A safety bag assembly according to claim 3, wherein the α-olefin in the ethylene-α-olefin copolymer rubber and the ethylene-α-olefin-non-conjugated diene copolymer rubber has 3–15 carbon atoms.

20. A safety bag assembly according to claim 3, wherein the non-conjugated diene in the ethylene-α-olefin-non-conjugated diene copolymer rubber is selected from the group consisting of dicyclopentadiene 1,4-hexadiene, ethylidenenorbornene and methylenenorbornene.

21. A safety bag assembly according to claim 3, wherein the silicone oil is selected from the group consisting of dimethyl silicone oil, methylphenyl silicone oil and alkyl-modified silicone oil.

* * * * *